(12) United States Patent
Kim

(10) Patent No.: US 8,009,265 B2
(45) Date of Patent: Aug. 30, 2011

(54) METHOD OF MANUFACTURING DISPLAY APPARATUS

(75) Inventor: Sang-Il Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 458 days.

(21) Appl. No.: 12/265,257

(22) Filed: Nov. 5, 2008

(65) Prior Publication Data
US 2009/0258564 A1    Oct. 15, 2009

(30) Foreign Application Priority Data
Apr. 14, 2008  (KR) .................. 10-2008-0034313

(51) Int. Cl.
G02F 1/13      (2006.01)
H01L 21/00     (2006.01)
(52) U.S. Cl. ......................................... 349/187; 438/30
(58) Field of Classification Search ............. 349/187; 438/30
See application file for complete search history.

(56) References Cited

U.S. PATENT DOCUMENTS
2006/0084193 A1 *  4/2006  Hwang et al. .................. 438/30
2009/0213319 A1 *  8/2009  Sasaki et al. .................. 349/189

FOREIGN PATENT DOCUMENTS
JP    2003257804    9/2003
JP    2005202286    7/2005
KR    1020040014309    2/2004
* cited by examiner Primary Examiner — Uyen Chau N Le
Assistant Examiner — Chris Chu
(74) Attorney, Agent, or Firm — H.C. Park & Associates, PLC

(57) ABSTRACT

In a method of manufacturing a display apparatus, a first display substrate is bonded to a first carrier substrate including a plurality of divided regions, and a second display substrate is bonded to a second carrier substrate. Then, the first display substrate is coupled with the second display substrate, and the second carrier substrate is separated from the second display substrate. After cutting the first display substrate and the second display substrate corresponding to the divided regions, the first carrier substrate is separated from the first display substrate.

20 Claims, 15 Drawing Sheets

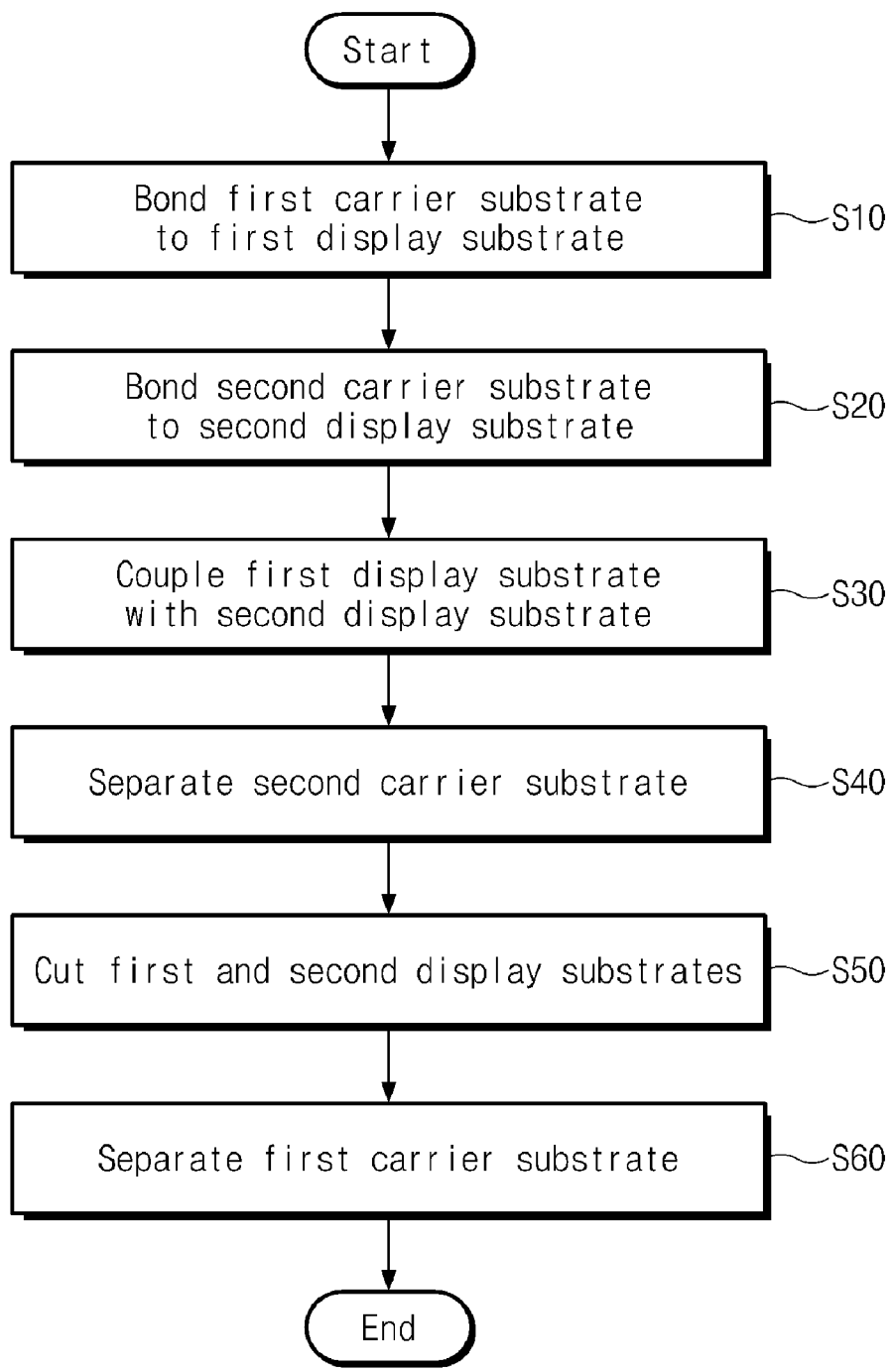

METHOD OF MANUFACTURING DISPLAY APPARATUS

CROSS-REFERENCE TO RELATED APPLICATION

This application claims priority from and the benefit of Korean Patent Application No. 2008-34313, filed on Apr. 14, 2008, which is hereby incorporated by reference for all purposes as if fully set forth herein.

BACKGROUND OF THE INVENTION

1. Field of the Invention

The present invention relates to a method of manufacturing a display apparatus. More particularly, the present invention relates to a method of manufacturing a display apparatus that may be capable of reducing the manufacturing cost.

2. Discussion of the Background

As information technologies have developed, an amount of communication information has significantly increased, thereby increasing the importance of the display apparatus's role in outputting information. Additionally, as the display apparatus is extensively used, the demand for the display apparatus has increased. Performance of the display apparatus has been improved to output various types of information while having a thinner and lighter structure. In this regard, the display apparatus may be made of a plastic substrate or a thin glass substrate, which are light and provide superior portability.

Generally, since a display apparatus having a slim plastic or glass substrate is thin and light, manufacturing the display apparatus may be difficult. Accordingly, the display apparatus may be manufactured by attaching a carrier substrate to the thin substrate.

According to a method of manufacturing the display apparatus, both thin upper and lower plates may be bonded to carrier substrates having the size of a motherboard, and the upper plate is then coupled to the lower plate. Then, after separating the carrier substrates from the upper and lower plates, the upper and lower plates may be cut together corresponding to the size of the display apparatus. In this state, polarization plates are attached to the upper and lower plates, and a module process is performed. However, since the upper and lower plates are thin, managing the upper and lower plates may be difficult, and failures in the assembly process may occur when cutting the upper and lower plates, attaching the polarization plates, and performing the module process.

SUMMARY OF THE INVENTION

The present invention provides a method of manufacturing a display apparatus that may be capable of reducing a failure rate of products.

Additional features of the invention will be set forth in the description which follows, and in part will be apparent from the description, or may be learned by practice of the invention.

The present invention discloses a method of manufacturing a display apparatus that is performed as follows. A first display substrate is bonded to a first carrier substrate having a plurality of divided regions, and a second display substrate is bonded to a second carrier substrate. The first display substrate is coupled with the second display substrate, and the second carrier substrate is separated from the second display substrate. The first display substrate and the second display substrate are cut at locations corresponding to the plural divided regions, and the first carrier substrate is separated from the first display substrate.

The present invention also discloses a method of manufacturing a display apparatus that is performed as follows. A first display substrate is bonded to a first carrier substrate, and a second carrier substrate having a plurality of divided regions is bonded to a second display substrate having a connection pad corresponding to each divided region. The first display substrate is coupled with the second display substrate, and the first carrier substrate is separated from the first display substrate. The first display substrate and the second display substrate are cut corresponding to the plural divided regions, and the second carrier substrate is separated from the second display substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 1 is a flowchart showing a method of manufacturing a display apparatus according to an exemplary embodiment of the present invention.

DETAILED DESCRIPTION OF THE ILLUSTRATED EMBODIMENTS

Figure 2A:
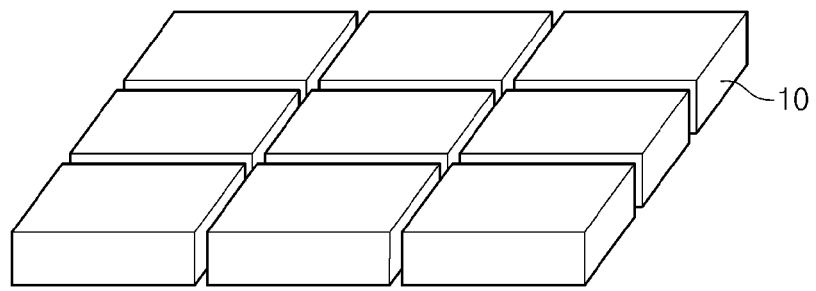
FIG. 2A, FIG. 2B, FIG. 2C, FIG. 2D, FIG. 2E, FIG. 3A, FIG. 3B, FIG. 3C, FIG. 3D, FIG. 3E, FIG. 4A, FIG. 4B, FIG. 4C, FIG. 5, FIG. 6A, FIG. 6B, FIG. 6C, FIG. 6D, FIG. 7A, and FIG. 7B are perspective views showing the method of manufacturing the display apparatus shown in FIG. 1.
Figure 2B:
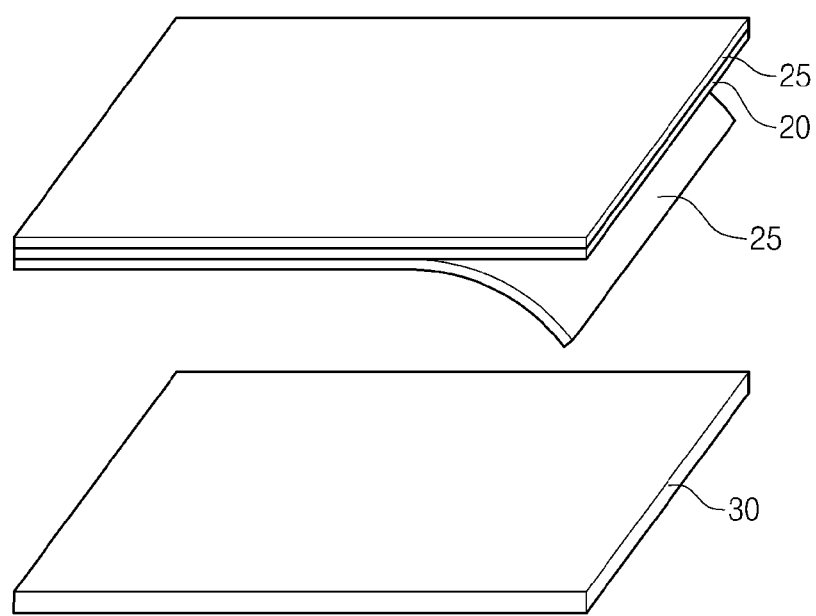
Figure 2C:
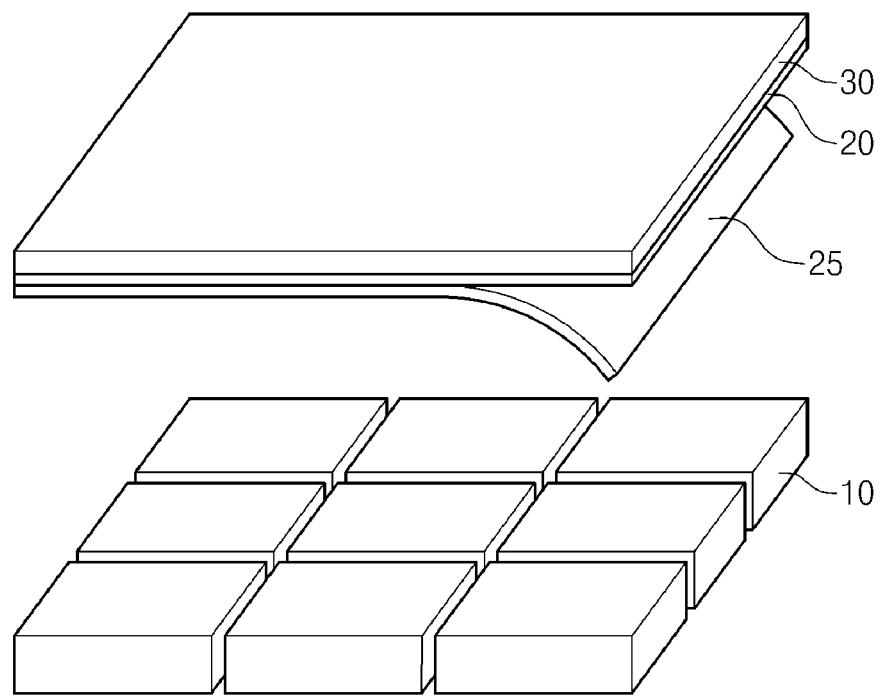
Figure 2D:
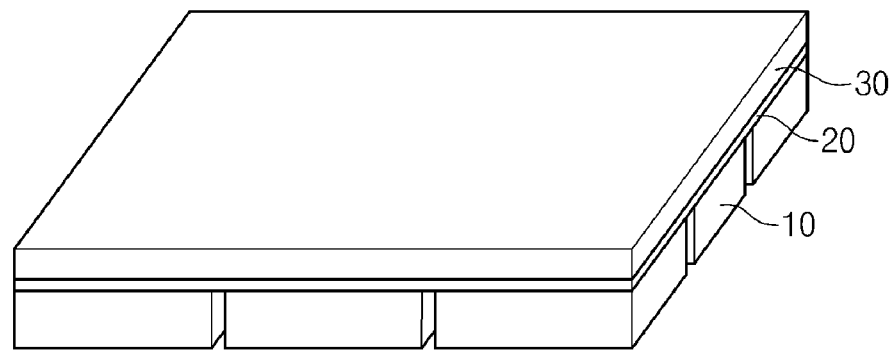

It will be understood that when an element or layer is referred to as being "on," "connected to," "bonded to," or "coupled to" another element or layer, it can be directly on, connected, bonded, or coupled to the other element or layer or intervening elements or layers may be present. In contrast, when an element is referred to as being "directly on," "directly connected to," "directly bonded to," or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the present invention will be explained in detail below with reference to the accompanying drawings.

FIG. 1 is a flowchart showing a method of manufacturing a display apparatus according to an exemplary embodiment of the present invention, and FIG. 2A, FIG. 2B, FIG. 2C, FIG. 2D, FIG. 2E, FIG. 3A, FIG. 3B, FIG. 3C, FIG. 3D, FIG. 3E, FIG. 4A, FIG. 4B, FIG. 4C, FIG. 5, FIG. 6A, FIG. 6B, FIG. 6C, FIG. 6D, FIG. 7A, and FIG. 7B are perspective views showing the method of manufacturing the display apparatus shown in FIG. 1.

Referring to FIG. 1 and FIGS. 2A to 7B, a first display substrate is bonded to a first carrier substrate (S10). In detail, as shown in FIG. 2A, a first carrier substrate 10, which was previously cut into a plurality of divided regions, is provided. Each divided region has a size corresponding to a display apparatus to be manufactured. Then, as shown in FIG. 2B, a first display substrate 30, which has a size corresponding to the size of the first carrier substrate 10, is provided. After preparing a double-sided adhesive member 20, a release film 25 is removed from one side of the adhesive member 20, and the adhesive member 20 is attached to the first display substrate 30. The first display substrate 30 may be a plastic substrate or a thin glass substrate. The adhesive member 20 may be a double-sided adhesive sheet with release films 25 on both of its sides. Next, as shown in FIG. 2C, the first display substrate 30 is disposed above the first carrier substrate 10, and the release film 25 is removed from the other side of the adhesive member 20. Thereafter, as shown in FIG. 2D, the first carrier substrate 10 is bonded to the first display substrate 30 using the adhesive member 20. In this case, the first display substrate 30 may be bonded to the first carrier substrate 10 through a lamination scheme or a vacuum bonding scheme. However, when the first display substrate 30 is made of glass, it should be bonded to the first carrier substrate 10 through the vacuum bonding scheme. According to the vacuum bonding scheme, targets to be bonded are arranged on top of one another in a chamber, the chamber becomes a vacuum, and the targets are bonded to each other.

Figure 2E:
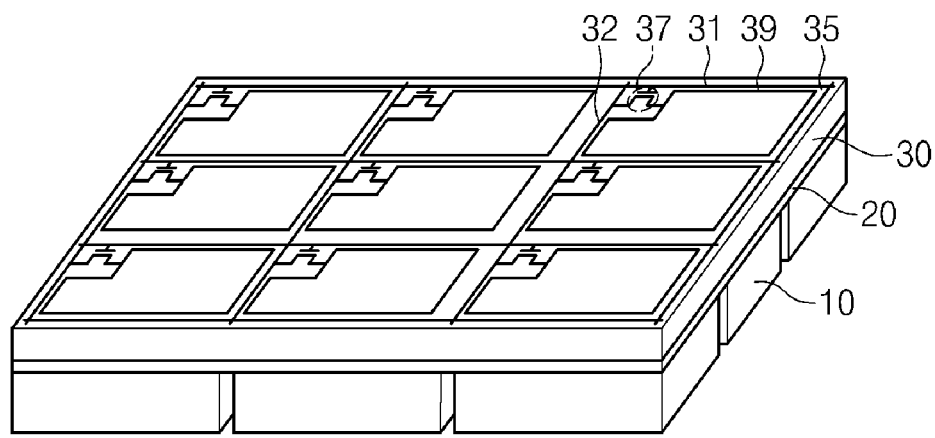

Subsequently, as shown in FIG. 2E, a thin film transistor 37 is formed on the first display substrate 30. A pixel area 35 is defined on the first display substrate 30 by gate lines 31 extending in a first direction and data lines 32 extending in a second direction and crossing the gate lines 31. The pixel area 35 may be formed corresponding to a divided region of the first carrier substrate 10. The pixel area 35 includes the thin film transistor 37, which is connected to both the gate and data lines 31 and 32, and a pixel electrode 39, which is connected to the thin film transistor 37. FIG. 2E shows a single thin film transistor 37 and a single pixel electrode 39 corresponding to each divided region of the first carrier substrate 10 for the purpose of explanation. Actually, a plurality of thin film transistors and a plurality of pixel electrodes are formed corresponding to each divided region. The structure of the thin film transistor 37 and the pixel electrode 39 will be more described below with reference to FIG. 4C.

As an alternative to the procedures described above, the first carrier substrate 10 may be bonded to the first display substrate 30 after the adhesive member 20 is first attached to the first carrier substrate 10. Additionally, the first carrier substrate 10 may be bonded to the first display substrate 30 after the thin film transistor 37 and the pixel electrode 39 are formed on the first display substrate 30.

Figure 3A:
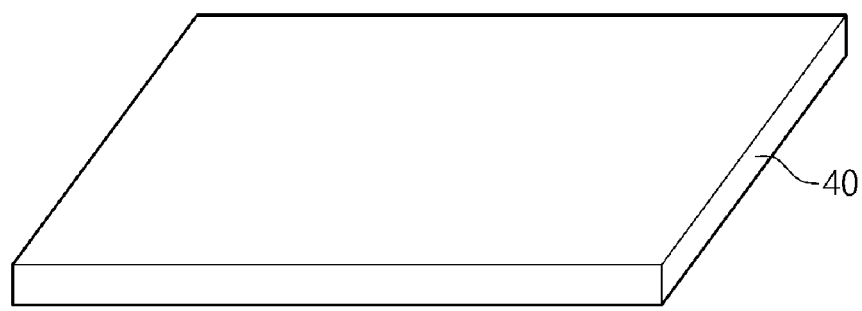
Figure 3B:
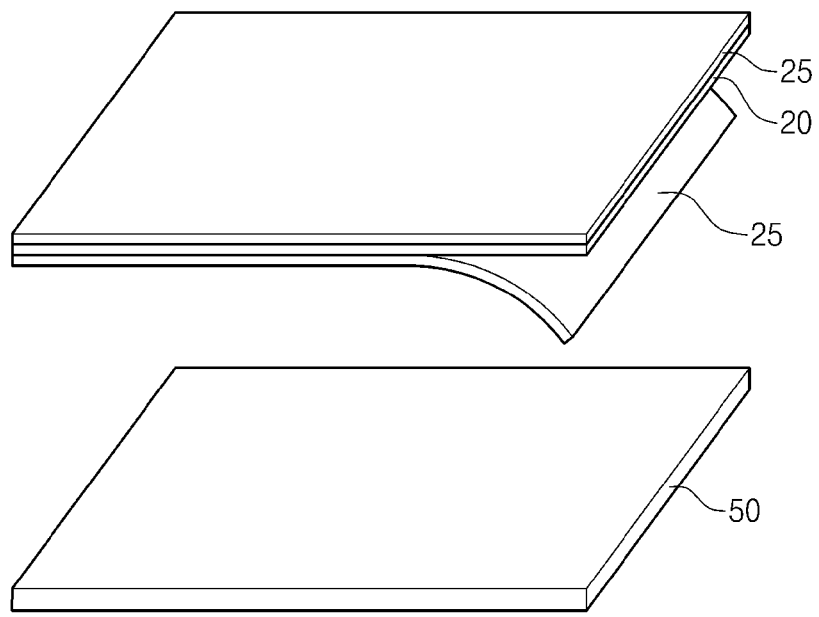
Figure 3C:
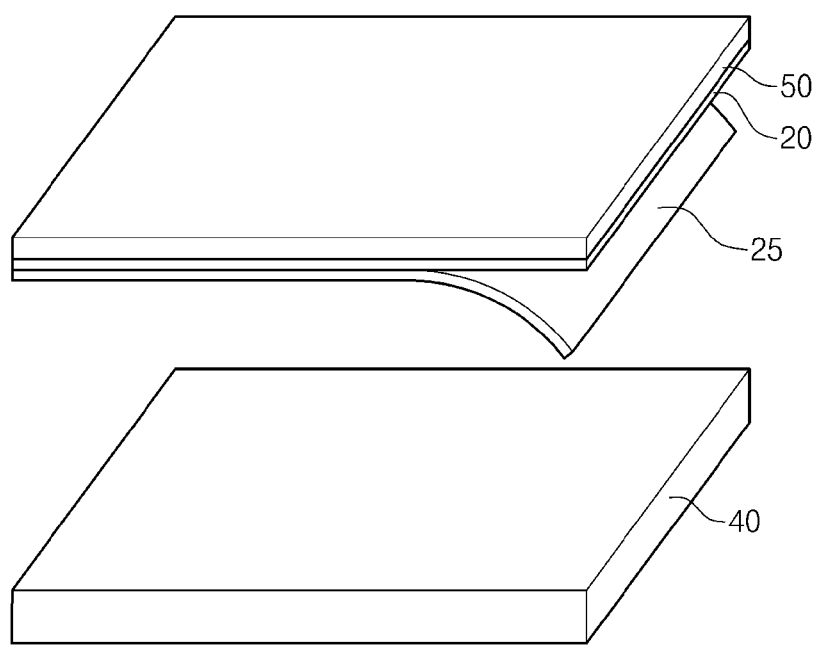
Figure 3D:
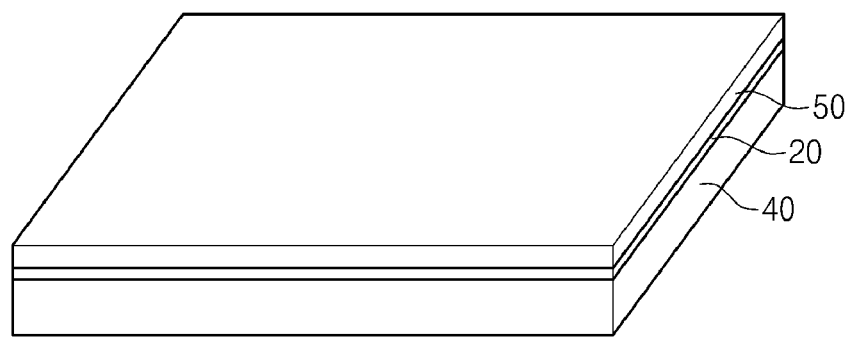

After the first carrier substrate 10 and the first display substrate 30 are bonded together, a second display substrate is bonded to a second carrier substrate (S20). In detail, as shown in FIG. 3A, a second carrier substrate 40 made of glass or plastic is provided. Next, as shown in FIG. 3B, a second display substrate 50 is provided. The second display substrate 50 has a size corresponding to the second carrier substrate 40. After preparing the adhesive member 20, the release film 25 is removed from one side of the adhesive member 20, and the adhesive member 20 is bonded to one side of the second display substrate 50. The second display substrate 50 may be a plastic substrate or a thin glass substrate. The adhesive member 20 may be a double-sided adhesive sheet having the release film 25 on both of its sides. Then, as shown in FIG. 3C, after the second display substrate 50 is disposed above the second carrier substrate 40, the release film 25 is removed from the other side of the adhesive member 20. Subsequently, as shown in FIG. 3D, the second carrier substrate 40 is bonded to the second display substrate 50 using the adhesive member 20. The second display substrate 50 may be bonded to the second carrier substrate 40 using a lamination scheme or a vacuum bonding scheme. For example, the second carrier substrate 40 may be fixed to a fixing tool. Then, the second display substrate 50 may be bonded to the second carrier substrate 40 through a roll lamination scheme. However, when the second display substrate 50 is made of glass, the second display substrate 50 may be damaged. Accordingly, in this case, the second display substrate 50 should be bonded to the carrier substrate 40 through the vacuum bonding scheme.

Figure 3E:
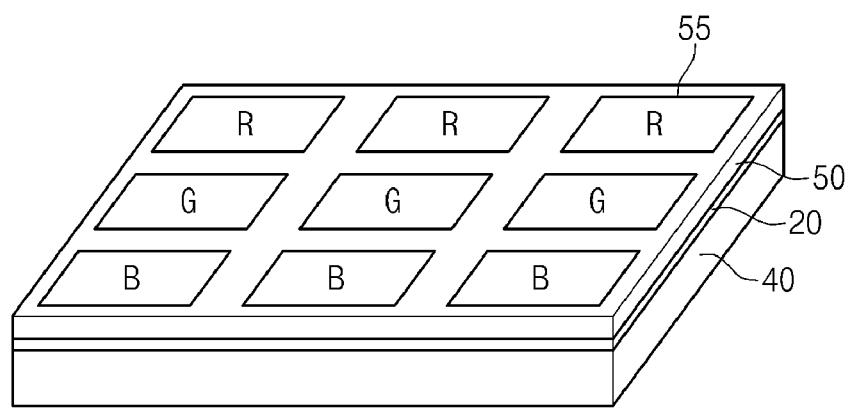

Then, as shown in FIG. 3E, a color filter 55 is formed on the second display substrate 50. The color filter 55 is formed corresponding to the pixel area 35 of the first display substrate 30. Actually, a plurality of color filters is formed corresponding to a plurality of pixel electrodes 39 of the first display substrate 30 in the pixel area 35. The color filter 55 includes organic materials to display a red color (R), a green color (G), or a blue color (B). Although not shown in FIG. 3E, a common electrode is formed on the color filter 55. The structure of the color filter 55 and the common electrode will be described below with reference to FIG. 4C.

As an alternative to the procedures described above, the second carrier substrate 40 may be bonded to the second display substrate 50 after the adhesive member 20 is first attached to the second carrier substrate 40. Additionally, the second carrier substrate 40 may be coupled to the second display substrate 50 after the color filter 55 and the common electrode are formed on the second display substrate 50.

Figure 4A:
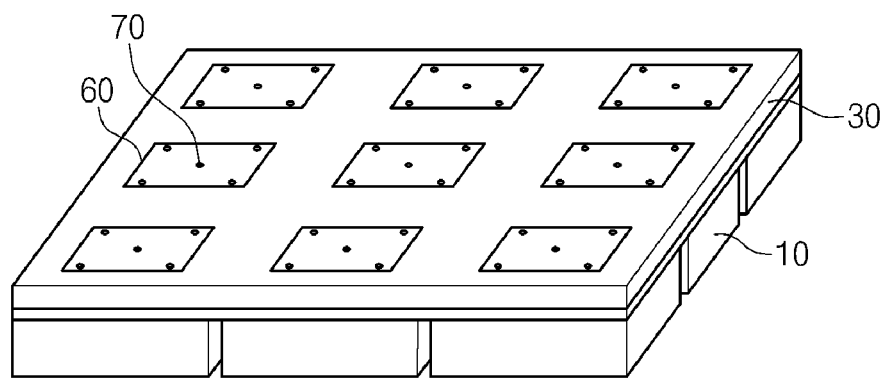
Figure 4B:
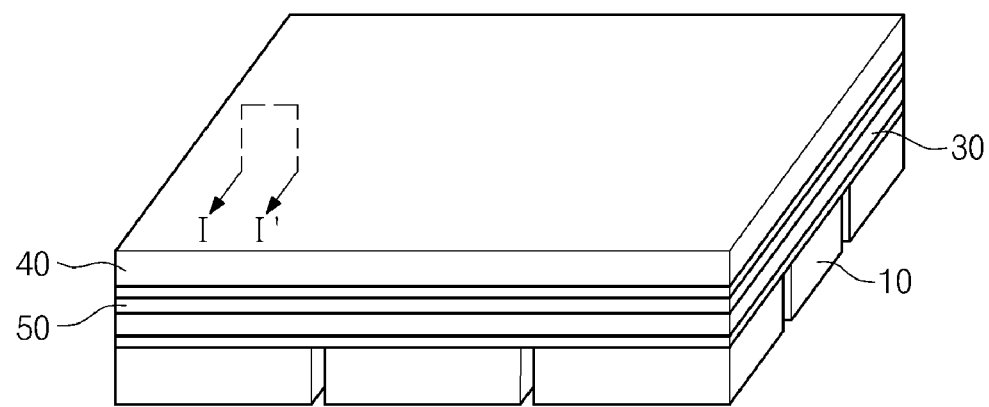

After the second carrier substrate 40 and the second display substrate 50 are bonded together, the first display substrate 30 is coupled to the second display substrate 50 (S30). In detail, as shown in FIG. 4A, a sealing line 60 is formed in the form of a closed loop on the first display substrate 30 by using a sealing material, and liquid crystal 70 may be dropped and filled at a predetermined point in the closed loop of the sealing line 60. The sealing line 60 is formed corresponding to each divided region of the first carrier substrate 10. Alternatively, the sealing line 60 may be formed on the second display substrate 50, and the liquid crystal 70 may be dropped on the second display substrate 50. Next, as shown in FIG. 4B, the first display substrate 30, which is bonded to the first carrier substrate 10, is aligned and coupled to the second display substrate 50, which is bonded to the second carrier substrate 40. The coupling structure of the first and second display substrates 30 and 50 will be described below with reference to FIG. 4C.

Figure 4C:
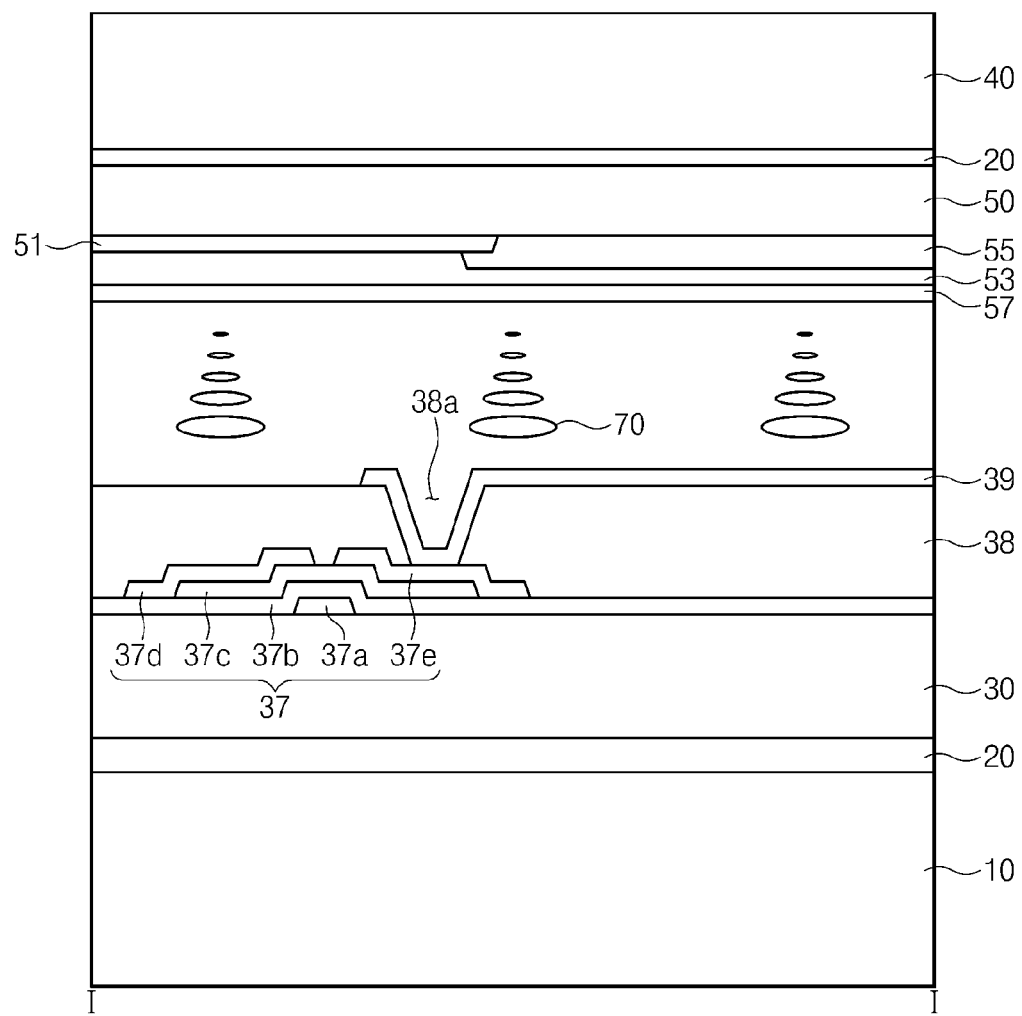

Referring to FIG. 4C, which is a sectional view taken along line I-I' of FIG. 4B, the first and second display substrates 30 and 50 are coupled to each other with the liquid crystal 70 disposed therebetween.

The first display substrate 30 includes the thin film transistor 37, a protective layer 38, and the pixel electrode 39. The thin film transistor 37 has a stacked structure in which a gate electrode 37a, an insulating layer 37b, a semiconductor layer 37c, a source electrode 37d, and a drain electrode 37e are sequentially stacked on the first display substrate 30. The pixel electrode 39 is formed on the protective layer 38, which covers the thin film transistor 37. The pixel electrode 39 may be made of a transparent conductive material. The pixel electrode 39 is connected to the drain electrode 37e through a contact hole 38a. Accordingly, the pixel electrode 39 is electrically connected to the thin film transistor 37.

The second display substrate 50 includes the color filter 55 and a common electrode 57. Additionally, the second display substrate 50 includes a black matrix 51 and a planarization layer 53. The black matrix 51 may include an organic material or metal to shield light. The color filter 55 partially covers the black matrix 51 and the second display substrate 50. The planarization layer 53 may cover the black matrix 51 and the color filter 55. The common electrode 57 is formed on the planarization layer 53. The common electrode 57 may be made of a transparent conductive material.

Figure 5:
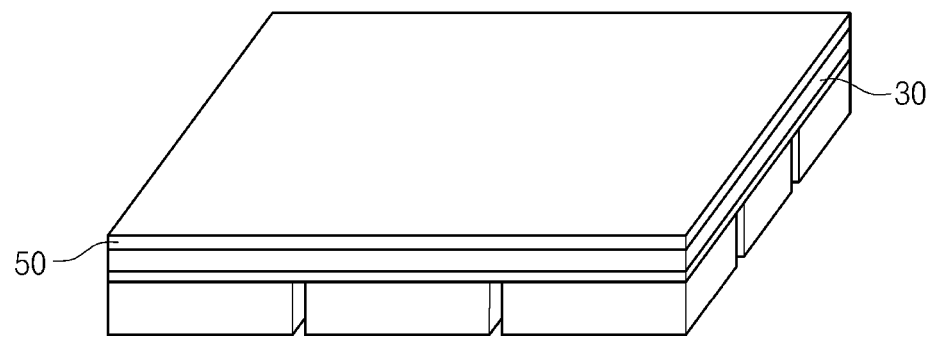

Next, the second carrier substrate 40 is separated (S40). In detail, as shown in FIG. 5, the second carrier substrate 40 is separated from the second display substrate 50. For example, when a laser beam is irradiated onto the second carrier substrate 40 while coupling the first display substrate 30 to the second display substrate 50 remains, an adhesive strength between the second display substrate 50 and the second carrier substrate 40 weakens. Accordingly, the second carrier substrate 40 may be separated from the second display substrate 50. The second carrier substrate 40 can be recycled.

Figure 6A:
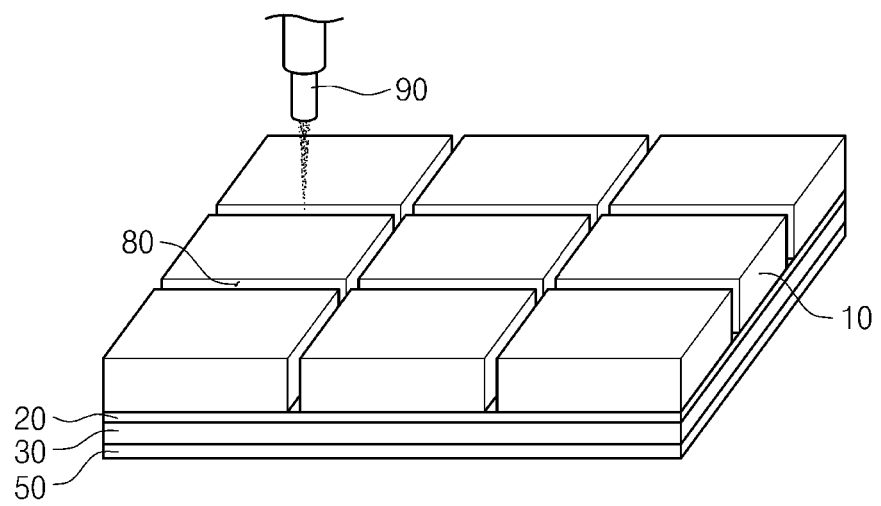
Figure 6B:
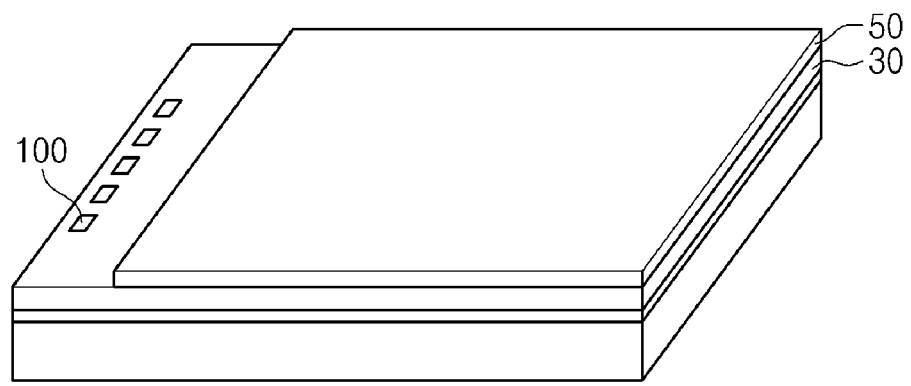
Figure 6C:
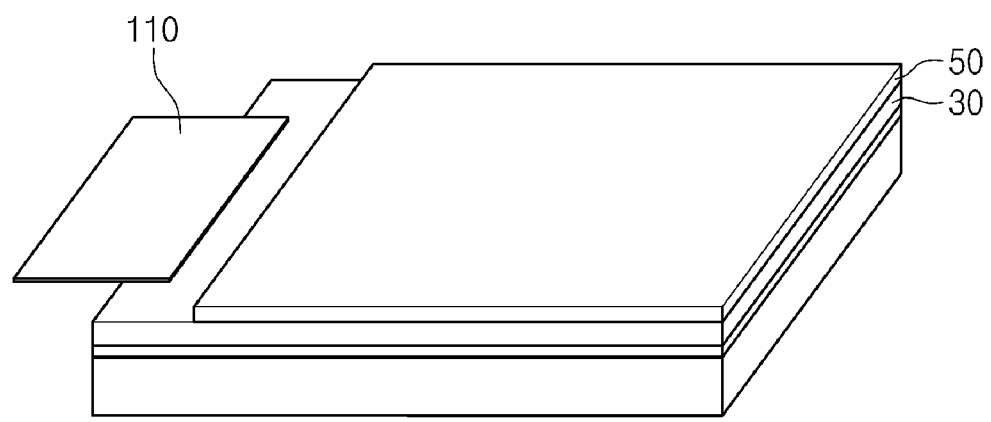
Figure 6D:
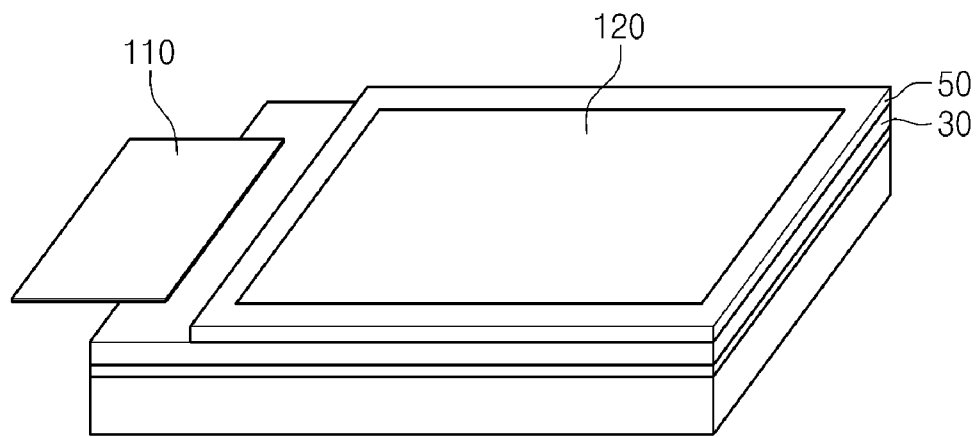

Then, the first and second display substrates 30 and 50 are cut (S50). In detail, as shown in FIG. 6A, after positioning the first carrier substrate 10 in the upper most position, the first and second display substrates 30 and 50 may be cut along a cutting line 80, which is defined in the form of a groove by the divided regions. For example, the coupling structure of the first and second display substrates 30 and 50 and the adhesive member 20 may be cut by a laser 90 or a blade (not shown). Accordingly, as shown in FIG. 6B, the first and second display substrates 30 and 50 are partitioned into the divided regions. Next, as shown in FIG. 6B, FIG. 6C, and FIG. 6D, a portion of the second display substrate 50, which contacts a connection pad 100 provided at one side of the first display substrate 30, is cut away. For example, this portion of the second display substrate 50 may be cut away using a laser beam. In this case, the second display substrate 50 should be cut away without damaging the first display substrate 30. Next, a driver 110 may be connected to the connection pad 100 of the first display substrate 30. For example, an anisotropic conductive film (ACF) may be attached to the connection pad 100, and an end portion of the driver 110 may be connected to the connection pad 100 in alignment with the connection pad 100. Thereafter, a first polarization plate 120 is coupled to one surface of the second display surface 50.

Figure 7A:
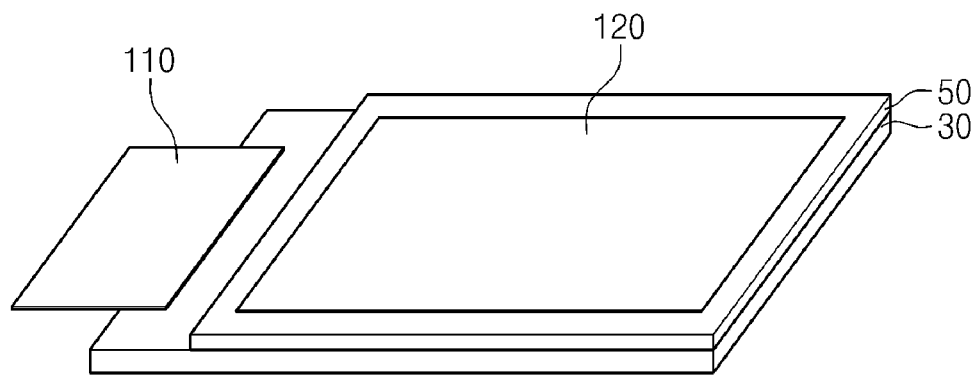
Figure 7B:
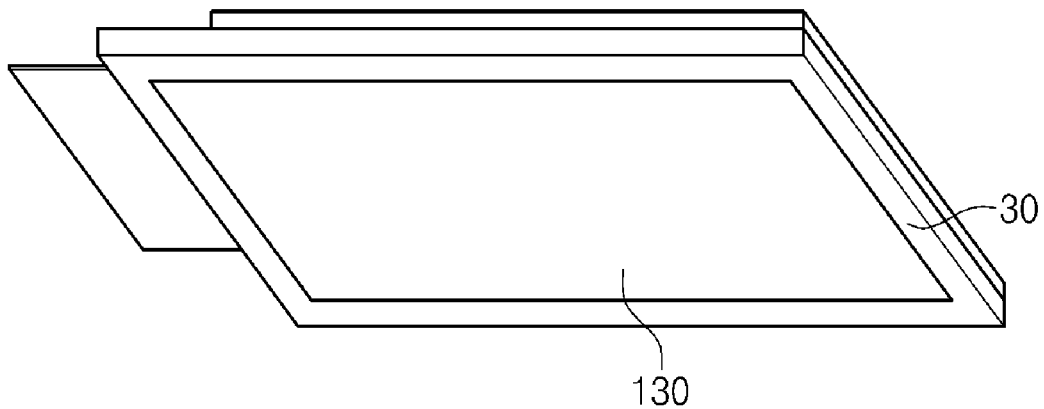

Next, the first carrier substrate 10 is separated (S60). In detail, as shown in FIG. 7A, the first carrier substrate 10 is separated from the first display substrate 30. For example, when a laser beam is irradiated onto the first carrier substrate 10 while the first carrier substrate 10 is bonded to the first display substrate 30, an adhesive strength between the first display substrate 30 and the first carrier substrate 10 weakens. Accordingly, the first carrier substrate 10 may be separated from the first display substrate 30. The first carrier substrate 10 may be recycled. As shown in FIG. 7B, a second polarization plate 130 is coupled to the first display substrate 30 to manufacture the display apparatus.

Figure 8:
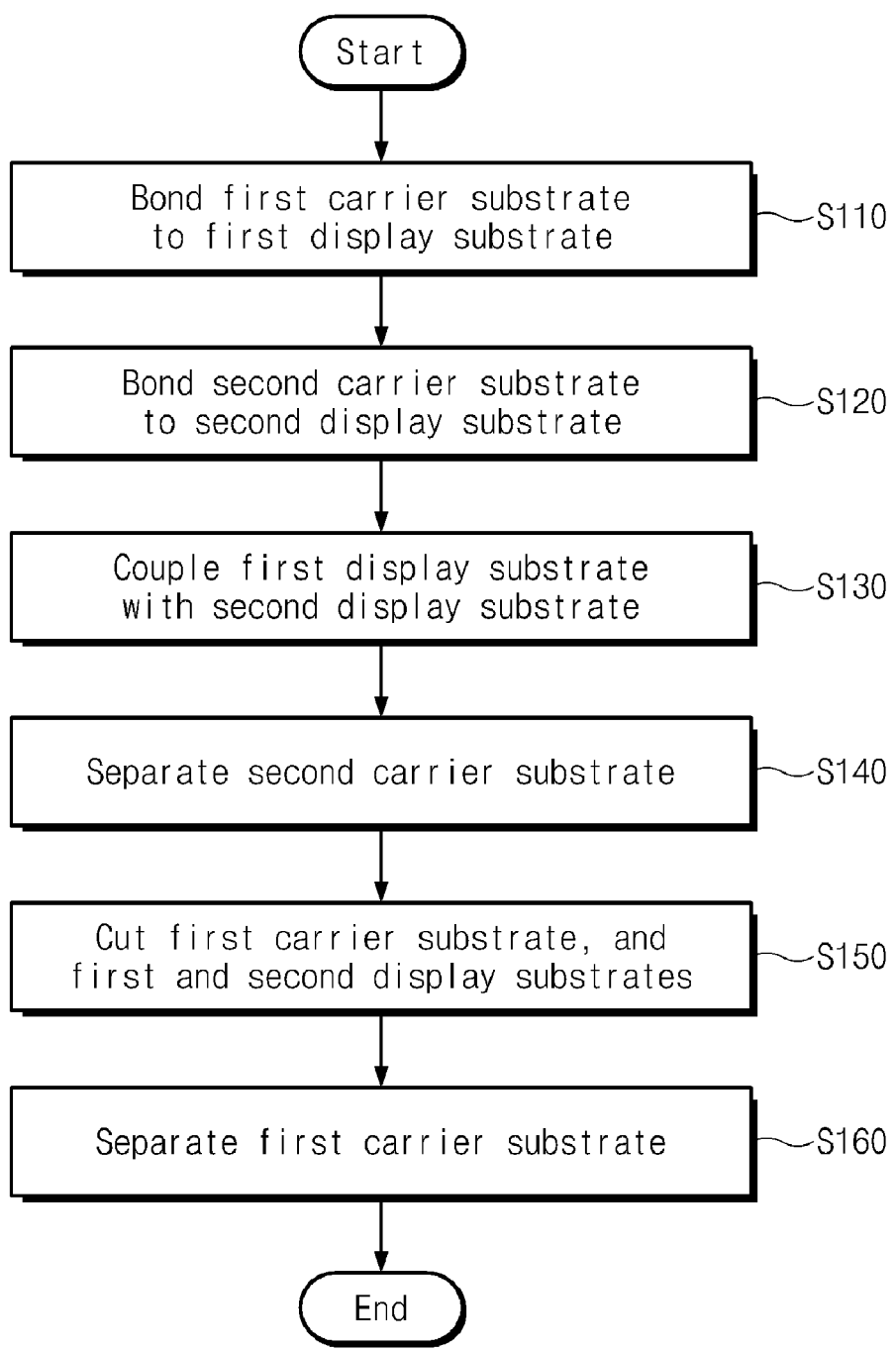
FIG. 8 is a flowchart showing a method of manufacturing a display apparatus according to another exemplary embodiment of the present invention.

A method of manufacturing a display apparatus according to another exemplary embodiment of the present invention will be described below with reference to FIG. 8, FIG. 9A, FIG. 9B, and FIG. 10. FIG. 8 is a flowchart showing a method of manufacturing a display apparatus according to an exemplary embodiment of the present invention, and FIG. 9A, FIG. 9B, and FIG. 10 are perspective views showing the method of manufacturing the display apparatus shown in FIG. 8.

Referring to FIG. 8, FIG. 9A, FIG. 9B, and FIG. 10, a first display substrate is bonded to a first carrier substrate (S110), and a second display substrate is bonded to a second carrier substrate (S120). Then, the first display substrate is coupled to the second display substrate (S130), and the second carrier substrate is separated from the second display substrate (S140). Next, the first carrier substrate and the first and second display substrates are cut (S150), and the first carrier substrate is separated from the first display substrate (S160).

In the following description, the same parts that have been described in the method of manufacturing the display apparatus with reference to FIG. 1 will be omitted.

Figure 9A:
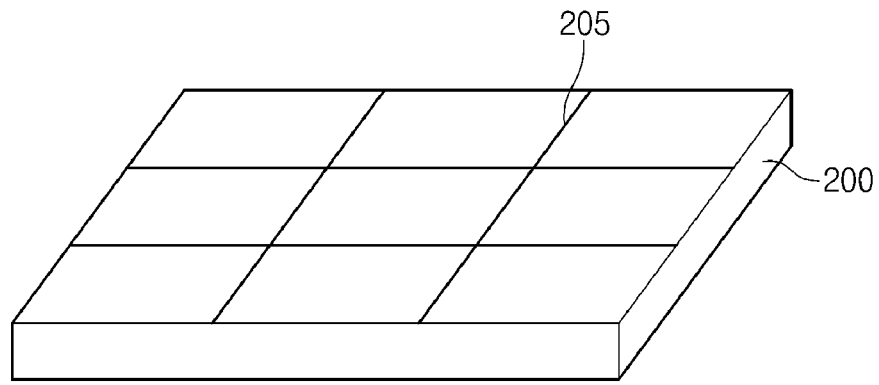
FIG. 9A, FIG. 9B, and FIG. 10 are perspective views showing the method of manufacturing the display apparatus shown in FIG. 8.
Figure 9B:
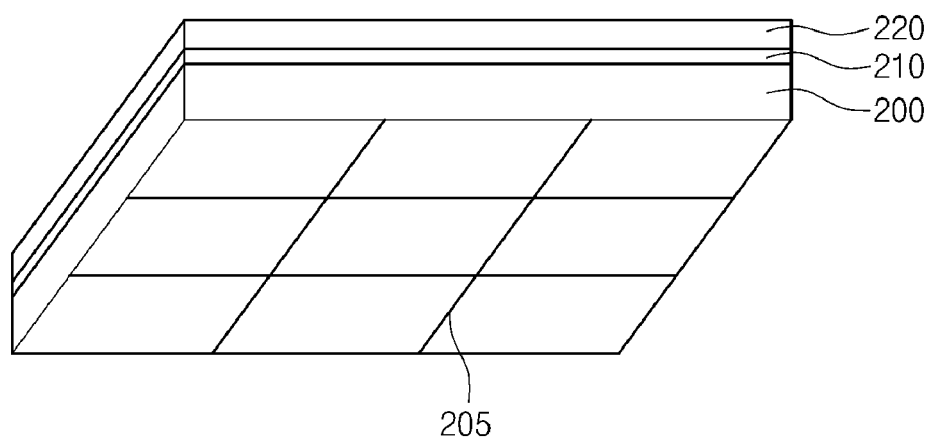
Figure 10:
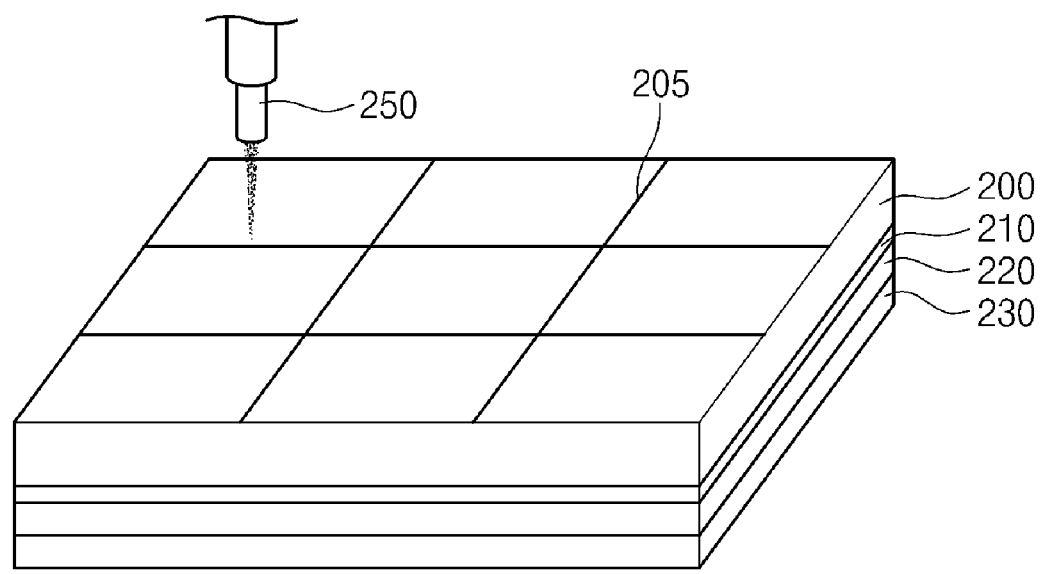

When the first display substrate is bonded to the first carrier substrate (S110), a first carrier substrate 200 is provided, and a cutting line 205 is marked on the first carrier substrate 200 to define a plurality of divided regions, as shown in FIG. 9A and FIG. 9B. For example, the cutting line 205 may be marked as one of a groove, a scratch, and a painted line on one surface or both surfaces of the first carrier substrate 200, thereby defining the divided regions. Then, after a first display substrate 220 and an adhesive member 210 are provided, the adhesive member 210 is attached to one surface of the first display substrate 220. Next, the first carrier substrate 200 is bonded to the first display substrate 220 with the adhesive member 210 disposed therebetween.

After the second display substrate is bonded to the second carrier substrate (S120), the first display substrate is coupled to the second display substrate (S130), and the second carrier substrate is separated from the second display substrate (S140), the carrier substrate 200, the first substrate 220, and a second display substrate 230 are cut (S150). In this case, as shown in FIG. 10, after positioning the first carrier substrate 200 at the upper most portion, the first carrier substrate 200 and the first and second display substrates 220 and 230 are cut along the cutting line 205. For example, the first carrier substrate 200, the adhesive member 210, the first display substrate 220, and the second display substrate 230 are substantially simultaneously cut along the cutting line 205 by using a laser 250.

After the first carrier substrate 200 is separated from the first display substrate 220, the first carrier substrate 200 may be recycled.

According to the manufacturing methods of the display apparatus described above, the display substrate may be easily managed, so that the display apparatus may be easily manufactured, and failure in the assembling of the display substrate and a driver may be reduced. Additionally, since carrier substrates may be recycled, the manufacturing cost of the display apparatus may be reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a display apparatus, comprising:
    bonding a first display substrate to a first carrier substrate, the first carrier substrate comprising a plurality of divided regions;
    bonding a second display substrate to a second carrier substrate;
    coupling the first display substrate with the second display substrate;
    separating the second carrier substrate from the second display substrate;
    cutting the first display substrate and the second display substrate at locations corresponding to the plural divided regions; and
    separating the first carrier substrate from the first display substrate.

2. The method of claim 1, wherein bonding the first display substrate to the first carrier substrate comprises:
    aligning the first carrier substrate comprising the plural divided regions and attaching an adhesive member to the first display substrate; and
    bonding the first carrier substrate to the first display substrate by using the adhesive member.

3. The method of claim 1, wherein bonding the first display substrate to the first carrier substrate comprises:
    marking a cutting line on the first carrier substrate, the cutting line defining the plural divided regions;
    attaching an adhesive member to the first display substrate; and
    bonding the first display substrate to the first carrier substrate by using the adhesive member.

4. The method of claim 3, wherein the cutting line is one of a groove, a scratch, and a line.

5. The method of claim 3, wherein cutting the first display substrate and the second display substrate comprises cutting the first carrier substrate, the first display substrate, and the second display substrate along the cutting line.

6. The method of claim 1, wherein coupling the first display substrate with the second display substrate comprises:
    forming a sealing line on one of the first display substrate and the second display substrate;
    disposing liquid crystal in a closed loop defined by a sealing line; and
    coupling the first display substrate with the second display substrate, the liquid crystal being disposed between the first display substrate and the second display substrate.

7. The method of claim 1, wherein the first display substrate comprises a connection pad corresponding to each divided region.

8. The method of claim 7, further comprising cutting a portion of the second display substrate corresponding to the connection pad after cutting the first display substrate and the second display substrate.

9. The method of claim 8, further comprising connecting a driver to the connection pad after cutting the portion of the second display substrate.

10. The method of claim 1, wherein bonding the second display substrate to the second carrier substrate comprises:
    attaching an adhesive member to the second display substrate; and
    bonding the second display substrate to the second carrier substrate by using the adhesive member.

11. The method of claim 1, further comprising coupling a first polarization plate with the second display substrate before separating the first carrier substrate from the first display substrate.

12. The method of claim 1, further comprising coupling a first polarization plate to the first display substrate after separating the first carrier substrate from the first display substrate.

13. The method of claim 1, further comprising forming a thin film transistor on the first display substrate after bonding the first display substrate to the first carrier substrate.

14. The method of claim 1, further comprising forming a color filter on the second display substrate after bonding the second display substrate to the second carrier substrate.

15. A method of manufacturing a display apparatus, comprising:
    bonding a first display substrate to a first carrier substrate;
    bonding a second carrier substrate comprising a plurality of divided regions to a second display substrate comprising a connection pad corresponding to each divided region;
    coupling the first display substrate with the second display substrate;
    separating the first carrier substrate from the first display substrate;
    cutting the first display substrate and the second display substrate at locations corresponding to the plural divided regions; and
    separating the second carrier substrate from the second display substrate.

16. The method of claim 15, wherein bonding the second carrier substrate to the second display substrate comprises:
    attaching an adhesive member to the second display substrate; and
    bonding the second carrier substrate to the second display substrate by using the adhesive member.

17. The method of claim 15, wherein bonding the second carrier substrate to the second display substrate comprises:
    marking a cutting line on the second carrier substrate, the cutting line defining the plural divided regions;

attaching an adhesive member to the second display substrate; and bonding the second carrier substrate to the second display substrate by using the adhesive member.

18. The method of claim 15, wherein separating the second carrier substrate from the second display substrate comprises:

coupling a first polarization plate with the first display substrate;

separating the second carrier substrate from the second display substrate; and coupling a second polarization plate with the second display substrate.

19. The method of claim 15, further comprising after cutting the first display substrate and the second display substrate:

cutting a portion of the first display substrate corresponding to the connection pad; and connecting a driver to the connection pad.

20. The method of claim 15, further comprising before coupling the first display substrate with the second display substrate:

forming a color filter on the first display substrate; and forming a thin film transistor on the second display substrate.

* * * * *